(12) United States Patent
Wu et al.

(10) Patent No.: US 8,724,866 B2
(45) Date of Patent: May 13, 2014

(54) MULTI-LEVEL CONTEXTUAL LEARNING OF DATA

(75) Inventors: Dijia Wu, North Brunswick, NJ (US); Le Lu, Chalfont, PA (US); Jinbo Bi, Chester Springs, PA (US); Yoshihisa Shinagawa, Downingtown, PA (US); Marcos Salganicoff, Bala Cynwyd, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 765 days.

(21) Appl. No.: 12/962,901

(22) Filed: Dec. 8, 2010

(65) Prior Publication Data

US 2011/0075920 A1 Mar. 31, 2011

Related U.S. Application Data

(63) Continuation-in-part of application No. 12/880,385, filed on Sep. 13, 2010, now abandoned.

(60) Provisional application No. 61/242,020, filed on Sep. 14, 2009.

(51) Int. Cl.
*G06K 9/00* (2006.01)

(52) U.S. Cl.
USPC ........... 382/128; 382/131; 382/155; 382/156; 382/181; 382/190; 706/12; 706/14; 706/15; 706/16; 706/20

(58) Field of Classification Search
None
See application file for complete search history.

(56) References Cited

U.S. PATENT DOCUMENTS

| | | | | |
|---|---|---|---|---|
| 7,289,653 | B2 * | 10/2007 | Zhang et al. | 382/131 |
| 2003/0223627 | A1 * | 12/2003 | Yoshida et al. | 382/128 |
| 2005/0165290 | A1 * | 7/2005 | Kotsianti et al. | 600/407 |
| 2006/0023927 | A1 * | 2/2006 | Zhang et al. | 382/131 |
| 2007/0217668 | A1 * | 9/2007 | Bornemann et al. | 382/132 |
| 2009/0010509 | A1 * | 1/2009 | Zhou et al. | 382/128 |
| 2009/0052763 | A1 * | 2/2009 | Acharyya et al. | 382/132 |
| 2009/0074272 | A1 * | 3/2009 | Lu et al. | 382/128 |
| 2011/0142301 | A1 * | 6/2011 | Boroczky et al. | 382/128 |

OTHER PUBLICATIONS

Rikxoort et al., Supervised Enhancement Filters: Application to Fissure Detection in Chest CT Scans, Jan. 2008, IEEE Transactions on Medical Imaging, Vol. 27, No. 1.*

Wu, D.; Le Lu; Jinbo Bi; Shinagawa, Y.; Boyer, K.; Krishnan, A.; Salganicoff, M.; "Stratified learning of local anatomical context for lung nodules in CT images," Computer Vision and Pattern Recognition (CVPR), 2010 IEEE Conference on, vol., No., pp. 2791-2798, Jun. 13-18, 2010.

(Continued)

*Primary Examiner* — Matthew Bella
*Assistant Examiner* — Jason Heidemann
(74) *Attorney, Agent, or Firm* — Peter R. Withstandley

(57) ABSTRACT

Described herein is a framework for automatically classifying a structure in digital image data are described herein. In one implementation, a first set of features is extracted from digital image data, and used to learn a discriminative model. The discriminative model may be associated with at least one conditional probability of a class label given an image data observation Based on the conditional probability, at least one likelihood measure of the structure co-occurring with another structure in the same sub-volume of the digital image data is determined. A second set of features may then be extracted from the likelihood measure.

18 Claims, 14 Drawing Sheets

(56) References Cited

OTHER PUBLICATIONS

Gupta, A.; Kembhavi, A.; Davis, L.S.; "Observing Human-Object Interactions: Using Spatial and Functional Compatibility for Recognition," Pattern Analysis and Machine Intelligence, IEEE Transactions on, vol. 31, No. 10, pp. 1775-1789, Oct. 2009.

Rabinovich, A.; Vedaldi, A.; Galleguillos, C.; Wiewiora, E.; Belongie, S.; "Objects in Context," Computer Vision, 2007. ICCV 2007. IEEE 11th International Conference on, vol., No., pp. 1-8, Oct. 14-21, 2007.

Gady Agam, et al., "Vessel Tree Reconstruction in Thoracic CT Scans With Application to Nodule Detection", IEEE Transactions on Medical Imaging, vol. 24, No. 4, Apr. 2005, pp. 486-499.

Vikas C. Raykar, et al., "Bayesian Multiple Instance Learning: Automatic Feature Selection and Inductive Transfer", ICML '08 Proceedings of the 25th international conference on Machine Learning, 2008.

Robert A. Ochs, et al., "Automated classification of lung bronchovascular anatomy in CT using AdaBoost", Medical Image Analysis, vol. 11, Issue 3, Jun. 2007, pp. 315-324.

Juerg Tschirren, et al., "Segmentation and Quantitative Analysis of Intrathoracic Airway Trees from Computed Tomography Images", The Proceedings of the American Thoracic Society 2:484-487 (2005).

Le Lu, Kentaro Toyama and Gregory D. Hager, "A Two Level Approach for Scene Recognition", CVPR'2005: IEEE Computer Society Conference on Computer Vision and Pattern Recognition, Jun. 2005, San Diego, USA.

Sanjiv Kumar, et al., "Discriminative Random Fields", International Journal of Computer Vision, vol. 68, No. 2, 179-201.

Yuri Boykov, et al., "Graph Cuts and Efficient N-D Image Segmentation", International Journal of Computer Vision 70(2), 109-131, 2006.

Jamie Shotton, et al., "TextonBoost for Image Understanding: Multi-Class Object Recognition and Segmentation by Jointly Modeling Texture, Layout, and Context", International Journal of Computer Vision, vol. 81, No. 1, 2-23, Jul. 2, 2007.

Lafferty, J., McCallum, A., Pereira, F.: Conditional random fields: Probabilistic models for segmenting and labeling sequence data. In: Proc. 18th International Conf. on Machine Learning, Morgan Kaufmann, San Francisco, CA (2001) 282-289.

* cited by examiner

702(a)

| GROUND TRUTH | PREDICTION (%) | | | | |
|---|---|---|---|---|---|
| | N | V | W | F | P |
| NODULE | 77.9 | 8.6 | 8.5 | 1.2 | 3.8 |
| VESSEL | 3.3 | 90.0 | 3.9 | 1.4 | 1.4 |
| WALL | 0.7 | 1.1 | 97.2 | 0 | 1.0 |
| FISSURE | 1.0 | 3.3 | 0.1 | 83.6 | 12.0 |
| PARENCHYMA | 0.5 | 0.6 | 0.6 | 1.4 | 96.9 |

704(a)

706(a)

702(b)

| GROUND TRUTH | PREDICTION (%) | | | | |
|---|---|---|---|---|---|
| | N | V | W | F | P |
| NODULE | 81.8 | 8.8 | 5.7 | 0.5 | 3.2 |
| VESSEL | 6.8 | 87.2 | 3.0 | 0.9 | 2.0 |
| WALL | 0.2 | 0.6 | 95.7 | 0.0 | 3.5 |
| FISSURE | 0.8 | 2.4 | 0.0 | 84.7 | 12.1 |
| PARENCHYMA | 0.1 | 0.4 | 0.4 | 0.5 | 98.6 |

|       | VESSEL |      | WALL |      | FISSURE |      |
|-------|--------|------|------|------|---------|------|
|       | SN     | SP   | SN   | SP   | SN      | SP   |
| N = 6  | 79.1  | 82.9 | 72.7 | 96.9 | 18.5 | 97.6 |
| N = 18 | 79.9  | 81.0 | 78.0 | 96.1 | 21.0 | 96.8 |
| N = 26 | 80.3  | 81.0 | 79.3 | 95.9 | 23.5 | 96.4 |

SN: sensitivity (%)　　　　SP: specificity (%)

Fig. 10

| | VESSEL | WALL | FISSURE |
|---|---|---|---|
| AUC | 0.8676 | 0.9275 | 0.8692 |
| SN | 82.0 | 93.3 | 83.8 |
| SP | 81.9 | 93.9 | 83.5 |

MULTI-LEVEL CONTEXTUAL LEARNING OF DATA

CROSS-REFERENCE TO RELATED APPLICATIONS

This application is a continuation-in-part of U.S. patent application Ser. No. 12/880,385 filed Sep. 13, 2010, which claims the benefit of U.S. Provisional Application No. 61/242,020, filed Sep. 14, 2009, all of which are herein incorporated by reference in their entirety.

TECHNICAL FIELD

The present disclosure relates to data processing and, more specifically, to automated or semi-automated systems and methods for analyzing and classifying structures in digital data by multi-level contextual learning.

BACKGROUND

The field of medical imaging has seen significant advances since the time X-Rays were first used to determine anatomical abnormalities. Medical imaging hardware has progressed in the form of newer machines such as Medical Resonance Imaging (MRI) scanners, Computed Axial Tomography (CAT) scanners, etc. Because of large amount of image data generated by such modern medical scanners, there has been and remains a need for developing image processing techniques that can automate some or all of the processes to determine the presence of anatomical abnormalities in scanned medical images.

Digital medical images are constructed using raw image data obtained from a scanner, for example, a CAT scanner, MRI, etc. Digital medical images are typically either a two-dimensional ("2-D") image made of pixel elements or a three-dimensional ("3-D") image made of volume elements ("voxels"). Four-dimensional (4-D) medical images containing information about 3-D volumes moving in time are also known. Such 2-D, 3-D or 4-D images are processed using medical image recognition techniques to determine the presence of anatomical structures such as lesions, cysts, tumors, polyps, etc. Given the amount of image data generated by any given image scan, however, it is preferable that an automatic technique should point out anatomical features in the to selected regions of an image to a doctor for further diagnosis of any disease or condition.

Automatic image processing and recognition of structures within a medical image is generally referred to as Computer-Aided Detection (CAD). A CAD system can process medical images and identify anatomical structures including possible abnormalities for further review. Such possible abnormalities are often called candidates and are considered to be generated by the CAD system based upon the medical images.

One particularly important use for medical imaging systems and CAD systems is in the review of lung images to detect and identify potentially malignant structures such as pulmonary nodules. Recent studies reveal that the location of the nodules in relation to other anatomical structures (e.g., fissure, pleural, vessel, etc.) provides contextual information that can help distinguish between benign and malignant lesions. For instance, vessel-attached pulmonary nodules are more likely to be cancerous than solitary (or purely intra-parenchymal) nodules, while fissure-attached or pleural-based (i.e. lung wall-attached) nodules are typically benign.

Despite its clinical importance, automatic classification of solitary pulmonary nodules and/or various attached nodules has not been extensively studied. Instead, manual labeling is typically performed. A trained radiologist physically inspects the images, and segments or colors the nodule and its local contextual structures on the voxel level. The connectivity of the nodule is manually labeled by determining whether the nodule touches the local contextual structures. This process is highly time-consuming, inefficient and prone to mistakes caused by fatigue and human error. Moreover, due to the low contrast and often ambiguous boundaries of the imaged structures, errors in analyzing the images are prevalent.

As such, there is a need for a robust framework that automatically or semi-automatically detects and classifies structures in image data.

SUMMARY

Automated and semi-automated systems and methods for processing digital image data described herein. A structure in the image data may be classified by extracting a first set of features from the digital image data and learning a discriminative model based on the first set of features. The discriminative model may be associated with at least one conditional probability of a class label given an image data observation Based on the conditional probability, at least one likelihood measure of the structure co-occurring with another structure in the same sub-volume of the digital image data is determined. A second set of features may then be extracted from the likelihood measure.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. The same numbers are used throughout the drawings to reference like elements and features.

FIG. 7 shows exemplary pairwise confusion matrices;

FIG. 10 shows a table illustrating the classification performance of nodule connectivity using hard segmentation results and an n-connected component algorithm;

FIG. 11($b$) shows the corresponding areas under the ROC curves;

FIG. 12($a$) shows a graph of exemplary fissure connectivity ROC curves;

DETAILED DESCRIPTION

Figure 1:
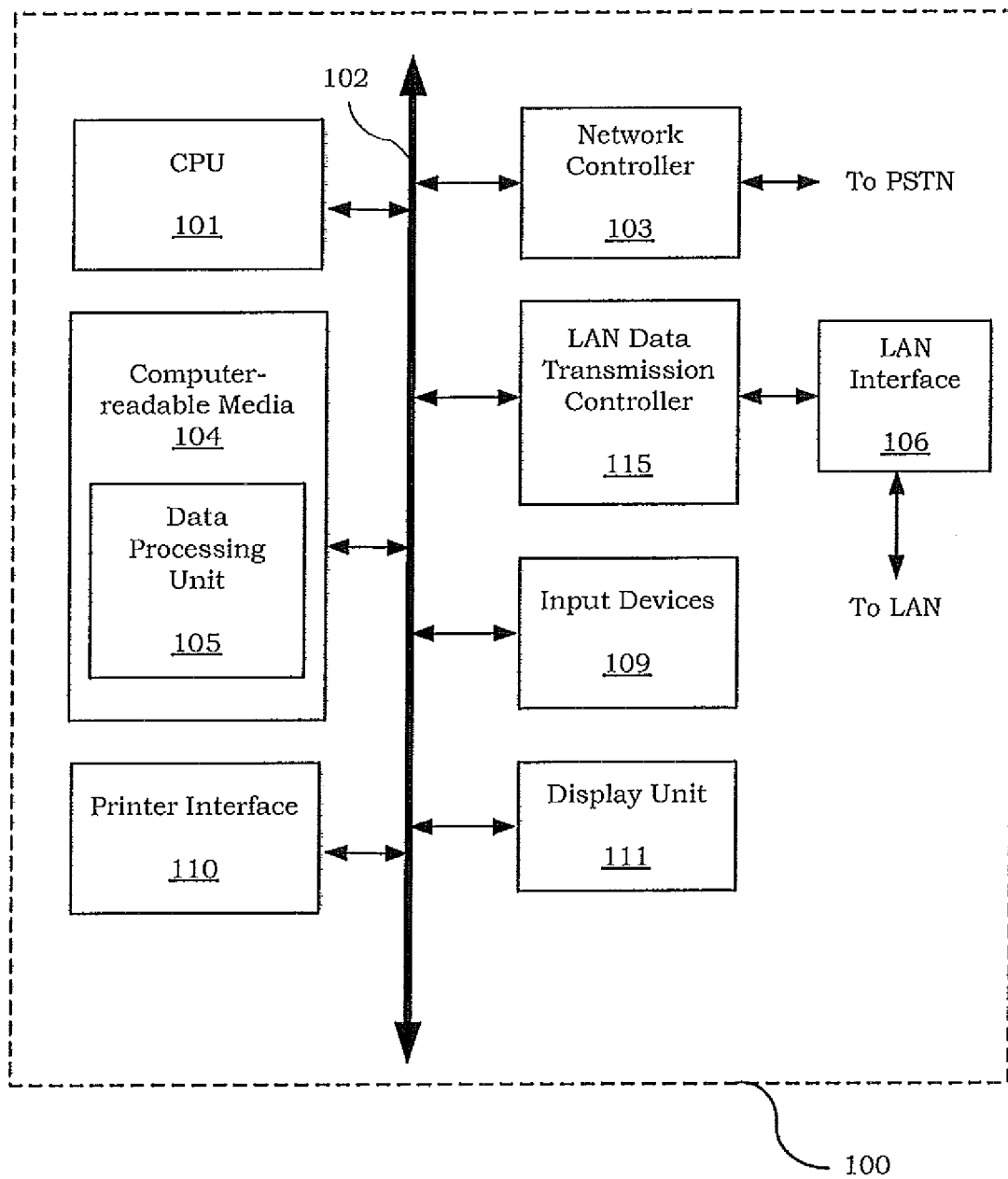
FIG. 1 shows an exemplary computer system.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including but not limited to X-Ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The following description sets forth one or more implementations of systems and methods that facilitate automated or semi-automated detection of structures (or objects) in digital image data. In one implementation, a multi-level contextual learning framework is used to identify complex, multi-label contextual connectivity of a structure of interest in image data. The multi-level learning framework uses local feature descriptors and a single statistical classifier to provide a simple and robust voxel-level segmentation of image data.

In one implementation, the multi-level contextual learning framework performs a voxel-level segmentation and a sub-volume-level classification. The voxel-level segmentation may include learning a discriminative model based on a voxel-level set of features. In one implementation, the discriminative model comprises a conditional random field (CRF) model. The CRF model may incorporate unified local cues (e.g., gray-level, texture, shape, or edge information) to improve the segmentation of boundary voxels, especially boundary voxels.

To enhance the appearance of plate-like structures that appear faint or indistinct, a Hessian enhancement filter may be iteratively applied to the segmentation results. The iterative Hessian enhancement filter advantageously reduces spurious responses in the image data, thereby improving the segmentation and classification of such plate-like structures. In addition, the segmentation results may be used as input for post-processing to further improve the segmentation accuracy of higher level learning systems. For example, the segmentation results may be further processed to classify the connectivity of a structure of interest.

In addition, a sub-volume level classification may be performed based on the segmentation results. The sub-volume classification may include determining a likelihood measure of two structures co-occurring in the same three-dimensional (3-D) sub-volume. Higher level statistical features may be extracted from such likelihood measure, revealing the spatial relations between the structure of interest and other structures. For example, the present framework may recognize whether a candidate lung nodule detected in the image data is connected to another anatomical structure (e.g., pulmonary vessel, fissure, pleura, etc.). Such spatial relations are useful in determining if the detected nodule is benign or malignant.

The present framework advantageously presents a generic approach capable of handling multiple structures. This is important as each type of structure typically presents a different set of challenges to the determination of the spatial relation between the structure and its contextual structures. For example, lung nodules are known to have a wide variety of morphologies, densities and sizes; and fissures appear as low contrast surfaces with possibly blur and incomplete boundaries. Vessel segmentation may be complicated by the low contrast of small vessels, and local ambiguities posed by crossing and branching points. More details will be provided in the following discussion.

It should be noted that, while a particular application directed to detecting and classifying lung nodules in computer-aided diagnosis of lung cancer is discussed in the following description, the present technology is not limited to the specific embodiments illustrated. The present technology has application to other types of contextual analysis, such as detecting closeness or connectivity of other anatomical structures in other medical imaging domains. In addition, the present technology may be used in non-medical applications. For example, the present technology may be applied to other types of computer vision problems, such as categorizing or organizing objects in real world scenes, or analyzing action in 3-D spatial-temporal video sequences.

Exemplary System

It is to be understood that embodiments of the present invention can be implemented in various forms of hardware, software, firmware, special purpose processes, or a combination thereof. In one embodiment, the present technology can be implemented in software as an application program tangibly embodied on a non-transitory computer readable medium. The application program can be uploaded to, and executed by, a machine comprising any suitable architecture. The system and method of the present disclosure may be implemented in the form of a software application running on a computer system, for example, a laptop, personal computer (PC), workstation, client device, mini-computer, storage system, handheld computer, server, mainframe computer, dedicated digital appliance, and so forth. The software application may be stored on a non-transitory recording media locally accessible by the computer system and accessible via a hard wired or wireless connection to a network, for example, a local area network, or the Internet.

FIG. 1 shows an example of a computer system which may implement a method and system of the present disclosure. The computer system referred to generally as system 100 may include, inter alia, a central processing unit (CPU) 101, a non-transitory computer readable media 104, a printer interface 110, a display unit 111, a local area network (LAN) data transmission controller 115, a LAN interface 106, a network controller 103, an internal bus 102, and one or more input devices 109, for example, a keyboard, mouse, tablet, etc.

The non-transitory computer-readable media 104 can include random access memory (RAM), read only memory (ROM), magnetic floppy disk, disk drive, tape drive, flash memory, etc., or a combination thereof. The present invention may be implemented as a data processing unit 105 that includes computer-readable program code tangibly embodied in non-transitory computer-readable media 104 and executed by the CPU 101. As such, the computer system 100 is a general purpose computer system that becomes a specific purpose computer system when executing the routine of the present invention. The computer-readable program code is not intended to be limited to any particular programming language and implementation thereof. It will be appreciated that a variety of programming languages and coding thereof may be used to implement the teachings of the disclosure contained herein.

The system 100 may also include an operating system and micro instruction code. The various processes and functions described herein can either be part of the micro instruction code or part of the application program or routine (or combination thereof) which is executed via the operating system. In addition, various other peripheral devices, such as an additional data storage device, a printing device and an imaging device, can also be connected to the computer platform. The imaging device may be a radiology scanner such as a magnetic resonance (MR) scanner or a computed tomographic (CT) scanner. The data processing unit 105 may be executed by the CPU 101 to process digital image data (e.g., MR or CT images) from the imaging device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

Exemplary Data Processing Unit

Figure 2:
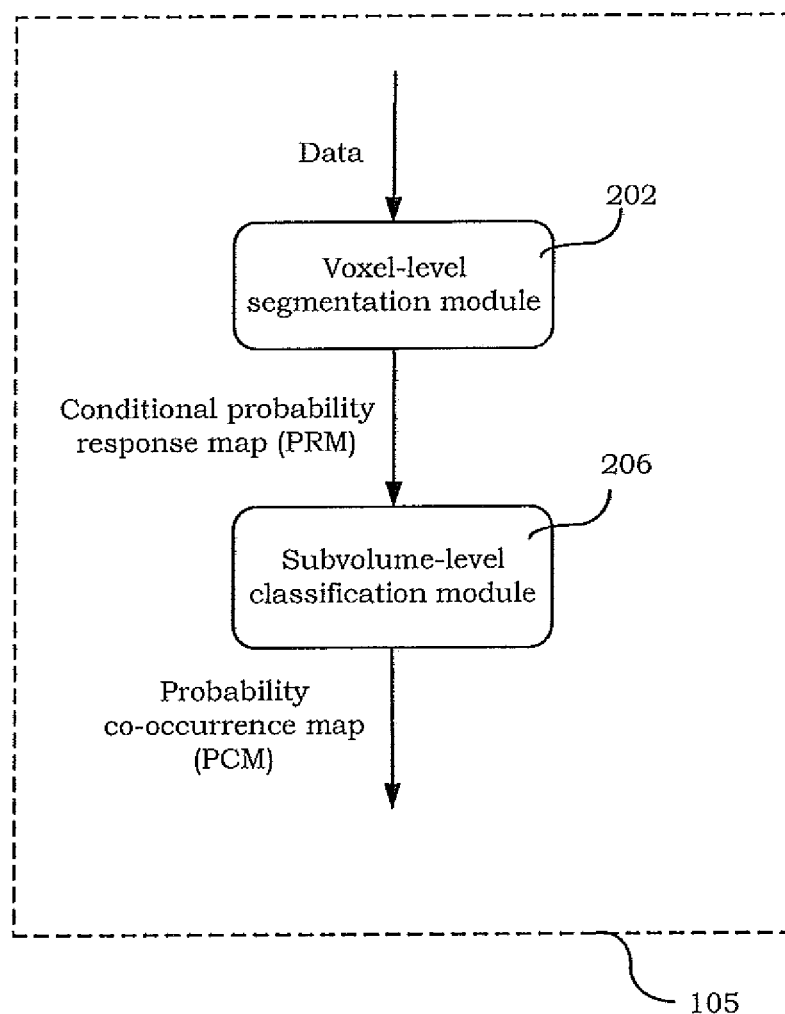
FIG. 2 shows an exemplary data processing unit.

FIG. 2 illustrates an exemplary data processing unit 105 operable to implement the techniques described herein. The data processing unit 105 provides a simple and robust strategy for classifying structures (or objects) while minimizing the details sacrificed. More particularly, the data processing unit 105 automatically parses and extracts features from digital data, classifies and labels the features in accordance with a multi-level framework that automatically learns the local anatomical context of the features. In one implementation, the multi-level framework is operable to recognize whether a candidate lung nodule detected in the image data is connected to another pulmonary structure, such as a lung vessel, fissure or wall, or whether it is solitary with background parenchyma.

As shown in FIG. 2, the data processing unit 105 includes a voxel-level segmentation module 202 and a subvolume-level classification module 206. The voxel-level segmentation module 202 receives image data (e.g., CT images) and performs a voxel-by-voxel segmentation of the image data. The voxel-by-voxel segmentation is fully automated and capable of handling multiple structures using a unified feature set. The aim at this stage is not to provide a perfect segmentation, but to provide a fast and robust method for generating reasonable segmentation results that can serve as input to a subvolume-level classification module 206 to learn the spatial layout of the candidate structure (e.g., lung nodule) and its contextual structures (e.g., lung vessels, wall, fissures, etc.).

In one implementation, the voxel-level segmentation module 202 constructs a discriminative model, such as a conditional random field (CRF) model. The CRF model may be associated with one or more conditional probability response maps (PRMs). The PRMs include at least one conditional probability of a class label given an image data observation. The use of a CRF model allows a single unified feature set to be incorporated. The unified feature set may include various cues, such as gray-level, texture, shape or edge features, so as to improve the segmentation of boundary voxels, especially lung nodule boundary voxels.

In one implementation, the voxel-level segmentation module 202 applies an iterative Hessian enhancement filter to the image data to enhance any plate-like structure that may be present. Exemplary plate-like structures include pulmonary fissure structures which commonly appear faint or indistinct. The iterative enhancement filter can significantly reduce spurious responses in the image background, as will be discussed later.

The subvolume-level classification module 206 receives the one or more generated PRMs from the voxel-level segmentation module 202 to form one or more probability co-occurrence maps (PCMs). The PCMs are likelihood measures that encode the spatial relations between the candidate structure and other anatomical landmarks. More specifically, the PCMs measure the spatial interaction (or attachment) likelihood of the candidate structure and other structures for connectivity classification. Based on the PCMs, higher level classifiers may be trained to recognize whether the candidate structure is connected to other structures.

Voxel-Level Segmentation

Figure 3:
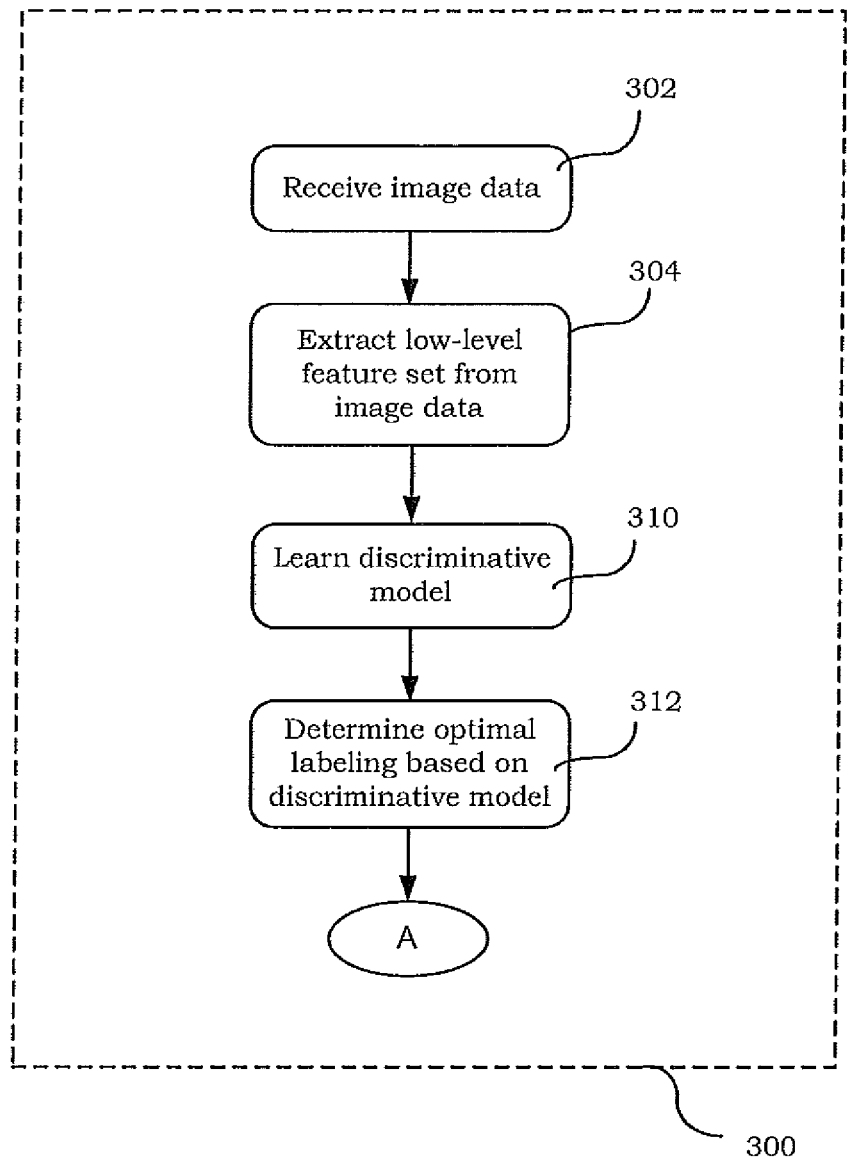
FIG. 3 shows an exemplary method.

FIG. 3 shows an exemplary method 300 implemented by the voxel-level segmentation module 202. Through the method 300, the voxels in the image are automatically classified into a number of classes, wherein voxels in a given class are substantially homogenous with respect to a given characteristic (e.g., texture, gray-level, shape, etc.). More particularly, the image data may be partitioned into semantically meaningful regions each labeled with a specific object class. For example, a lung image may be segmented into regions corresponding to the lung nodule, wall (i.e. pleura), vessel, fissure, or parenchyma (i.e. background).

At 302, the voxel-level segmentation module 202 receives image data. The image data comprises, for example, two-dimensional (2-D) cross-sectional images or three-dimensional (3-D) volumetric image data reconstructed from acquired cross-sectional slice images. The cross-sectional images may be acquired by an imaging device using magnetic resonance (MR) imaging, computed tomography (CT), helical CT, x-ray, positron emission tomography, fluoroscopy, ultrasound or single photon emission computed tomography (SPECT). Other types of imaging modalities may also be used. In one implementation, the image data comprises digitized medical images of an anatomical structure (e.g., lung), or at least a portion of the anatomical structure.

At 304, the voxel-level segmentation module 202 extracts a low-level (or voxel-level) feature set from the image data. The feature set may be computed from a cubic sub-volume of interest (e.g., 7×7×7 voxels) across a larger sub-volume. The collection of low-level features is selected based on known characteristics of the imaging device and the imaging process. In one implementation, the feature set incorporates unified local texture, gray-level (or intensity), and/or shape information. It is understood that other types of information, such as color, edge or other image properties, may also be incorporated. Various heuristic and/or statistical operations may be applied on such properties to generate the feature set.

In one implementation, the texture feature is extracted by computing a gray-level co-occurrence matrix (GLCM), which is also known as the Gray Tone Spatial Dependency Matrix. The GLCM stores the co-occurrence frequencies of pairs of gray levels, or how often voxel brightness values occur in an image region. In one implementation, the GLCM searches for gray level pairs in 26 directions. See, for example, Y. Xu, M. Sonka, G. McLennan, J. Guo, and E. A. Hoffman, *MDCT Based 3-D Texture Classification of Emphysema and Early Smoking Related Lung Pathologies*, IEEE Trans. Med. Imaging, 25(4):464-475, April 2006, which is herein incorporated by reference.

Alternatively, or in combination thereof, the texture feature may also be extracted by computing local binary patterns (LBPs). The LBP method is an intensity- and rotation-invariant generalization of the GLCM method. It is described in, for example, Y. Tao, L. Lu, M. Dewan, et al., *Multi-level Ground Glass Opacity Detection and Segmentation in CT Lung Images*, Proc. MICCAI, 2009, LNCS 5762:715-723, which is herein incorporated by reference. The texture feature may also include wavelets, such as 3D Harr wavelets, which capture the local spatial and frequency information. See, for example, Y. Tao, L. Lu, M. Dewan, et al., *Multi-level Ground Glass Opacity Detection and Segmentation in CT Lung Images*, Proc. MICCAI, 2009, LNCS 5762:715-723, which is herein incorporated by reference.

A gray-level feature can be a good indicator of which anatomical structure a voxel corresponds to, because radiation attenuation in CT scans varies with body tissues of different atomic weight and density. In one implementation, the gray-level features include the original intensity value and/or at least one gray-level statistics feature, such as the minimum, maximum, mean, standard deviation, or kurtosis. Other types of gray-level features, such as pixel index ratios, may also be used.

The shape of a structure also provides useful information in the recognition process. For example, lung nodules, vessels and fissures are embodied in different anatomical shapes. Nodules are modeled as faint or light blobs, while vessels and fissures are modeled as light tubular and faint plate-like structures respectively. In one implementation, shape features are extracted by computing a set of multi-scale structure enhancement filters. These filters may be based on Hessian matrix eigenvalues to differentiate the three types of pulmonary structures. Exemplary enhancement filters $N(\lambda)$, $V(\lambda)$ and $F(\lambda)$ for respectively modeling a blob-like structure (e.g., lung nodule), tube-like structure (e.g., lung vessel) and a plate-like structure (e.g., fissure) are shown as follows:

$$N(\lambda)=(1-\exp(-(\lambda_1^2+\lambda_2^2+\lambda_3^2)/2\gamma^2))(1-\exp(-\lambda_3^2/2\alpha^2|\lambda_1\lambda_2|))h(-\lambda_1)h(-\lambda_2)h(-\lambda_3) \quad (1)$$

$$V(\lambda)=(1-\exp(-(\lambda_1^2+\lambda_2^2+\lambda_3^2)/2\gamma^2))(1-\exp(-\lambda_2^2/2\alpha^2\lambda_1^2))\exp(-\lambda_3^2/2\beta^2|\lambda_1\lambda_2|)h(-\lambda_1)h(-\lambda_2) \quad (2)$$

$$F(\lambda)=(1-\exp(-(\lambda_1^2+\lambda_2^2+\lambda_3^2)/2\gamma^2))\exp(-\lambda_2^2/2\beta^2\lambda_1^2)h(-\lambda_1) \quad (3)$$

where $\lambda=\{\lambda_1, \lambda_2, \lambda_3\}$ are three eigenvalues of the Hessian matrix with $|\lambda_1|\geq|\lambda_2|\geq|\lambda_3|$, and h(.) denotes the standard unit step function. The thresholds $\alpha$, $\beta$ and $\gamma$ control the sensitivity of the filters to the eigenvalue measures, which may be set at, for example, 0.5, 0.5 and 200 each. It is understood that these equations are merely exemplary and other variations may also be used.

The theory for these enhancement filters $N(\lambda)$, $V(\lambda)$ and $F(\lambda)$ is based on the different intensity curvatures predicted for each structure. For example, blob-like structures (e.g., lung nodules) are expected to have three large negative eigenvalues $\lambda_1 \approx \lambda_2 \approx \lambda_3 \ll 0$, indicating the increased attenuation inside the nodule in any direction. With respect to tube-like structures (e.g., pulmonary vessels), two large negative eignenvalues $\lambda_1 \approx \lambda_2 \ll 0$ and one small eigenvalue $\lambda_3 \approx 0$ corresponding to the eigenvector in the direction to the trajectory of the vessel may be used. As for plate-like structures (e.g., pulmonary fissures), one large negative eigenvalue $\lambda_1 \ll 0$ corresponding to the eigenvector normal to the fissure plane, and two small eigenvalues $\lambda_2 \approx \lambda_3 \approx 0$ corresponding to the eigenvectors parallel to the plane may be used.

Figure 5:
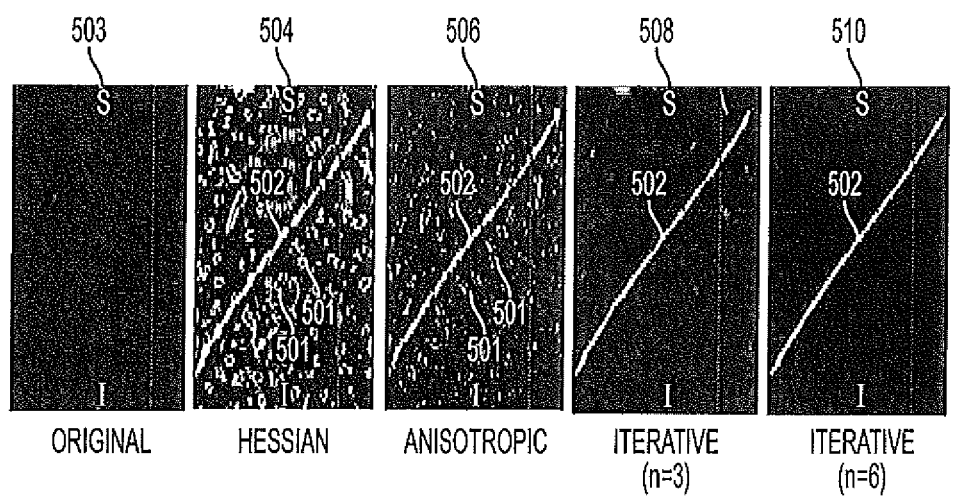
FIG. 5 shows exemplary original and filtered images.

An iterative Hessian eigenvalue-based filter is optionally applied to the image data to enhance plate-like structures, such as lung fissure structures. As shown in FIG. 5, Hessian and anisotropic filters commonly generate spurious responses 501 in the background of the images. Images 508 and 510 are generated by applying a Hessian eigenvalue-based filter to the image data for 3 and 6 iterations respectively, so as to reduce spurious responses 501 and enhance the fissure structure 502.

The Hessian eigenvalue-based filter may be derived by modeling a simplified plate-like structure as follows:

$$I(x,y,z)=(h(x+w_x/2)-h(x-w_x/2))\cdot(h(y+w_y/2)-h(y-w_y/2)) \quad (4)$$

where $h(\cdot)$ is the unit step function, $w_x$ and $w_y$ are the plate widths in x and y directions respectively, assuming that $w_x \ll w_y$.

Based on the plate-like structure model, the resulting Hessian matrix eigenvalues $\lambda_x$, $\lambda_y$ and $\lambda_z$ in the x, y and z directions respectively are as follows:

$$\lambda_x = G'_\sigma(x+w_x/2) - G'_\sigma(x-w_x/2) \text{ wherein } |x| \leq w_x/2 \quad (5)$$

$$\lambda_y = G'_\sigma(y+w_y/2) - G'_\sigma(y-w_y/2) \text{ wherein } |y| \leq w_y/2 \quad (6)$$

$$\lambda_z = 0 \quad (7)$$

where $G'_\sigma(\cdot)$ is the first derivative of a Gaussian function with a standard deviation $\sigma$ and a zero mean.

In one implementation, the Hessian matrix eigenvalues obtained by computing Equations (5), (6) and (7) are incorporated in enhancement filter equation (3), to which was previously described. Filter equation (3) is then iteratively applied to the image data until a stop condition is satisfied. The stop condition may be, for example, reaching a predetermined number of iterations. Other stop conditions may also be used. The iterative application of the filter equation (3) results in the enhancement of any plate-like structures in the image data and the reduction of any spurious responses that may be present.

Figure 4:
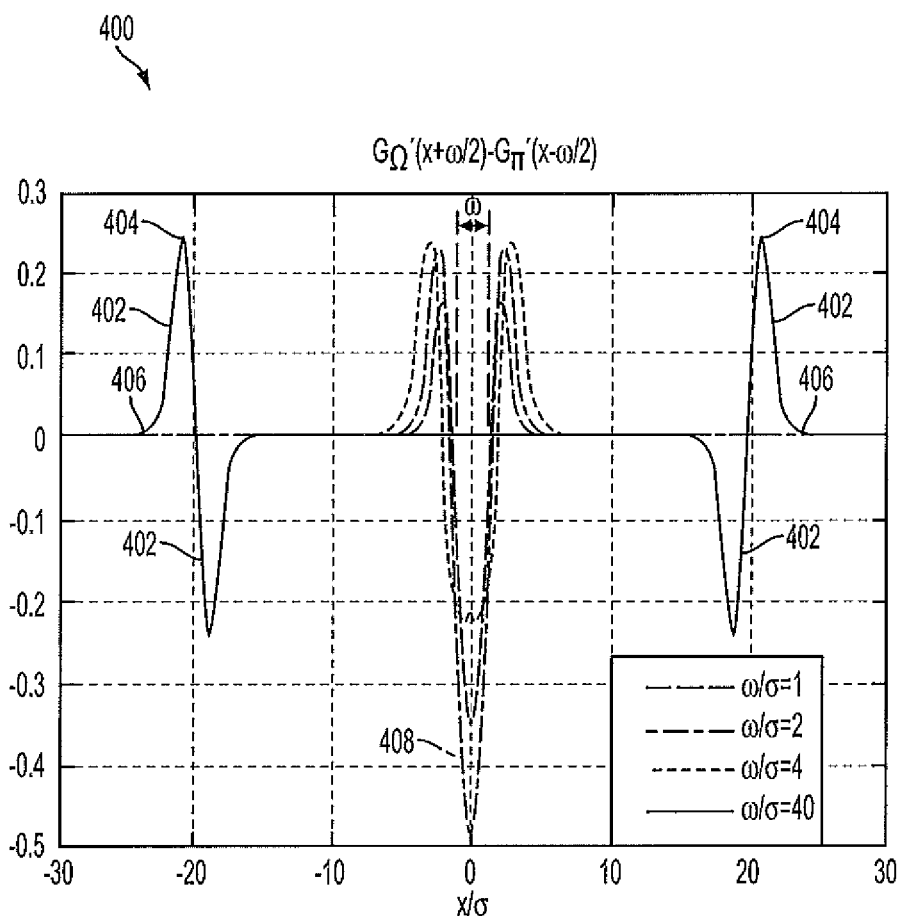
FIG. 4 shows a graph depicting the curves of an exemplary eigenvalue function.

FIG. 4 shows a graph 400 depicting the curves of the eigenvalue function $\lambda(x)=G'_\sigma(x+w/2)-G'_\sigma(x-w/2)$ as a function of $x/\sigma$ with different values of $w/\sigma$. It can be observed that when $w/2 \gg \sigma$, $\lambda(x)$ has two lobes 402 of opposite signs on each side of the edges $x=\pm w/2$. $\lambda(x)$ reaches the maximum absolute value 404 at $|x \pm w/2|=\sigma$, and approaches to zero at 406 for $|x \pm w/2| \geq 4\sigma$. Another observation that can be made is that when $w/2 \approx \sigma$, $\lambda(x)$ has a central negative lobe 408 with a width approximately equal to w. It can be proved that $\lambda(x)$ reaches the minimum at $x=0$ if $w/\sigma \leq 2\sqrt{3}$.

Therefore, for plate-like structures with $w_x \ll w_y$, the scale $\sigma \approx w_x/2$ is selected so that $|\lambda_x/\lambda_y|$ is maximized for $|x| < w_x/2$ and $|y| < w_y/2-4\sigma$, but drops significantly when $|y|$ approaches $w_y/2-\sigma$. As a result, the plate-like structure will maintain a plate width $w_x$, and shrink around the edges $y=\pm w_y/2$ after applying filter equation (3) with the Hessian matrix eigenvalues $\lambda_x$, $\lambda_y$ and $\lambda_z$. If $w_y$ is not significantly higher than $w_x$, the whole structure will be reduced after applying the filter multiple times.

FIG. 5 shows exemplary filtered images 504-510 generated by applying the various types of filters to the original image 503. Filter scale $\sigma$ is selected as 1 mm because typical fissures are approximately 1-3 mm thick. Images 504 and 506 are output images obtained by applying conventional Hessian and anisotropic filters respectively. Images 508 and 510 are generated by applying the Hessian eigenvalue-based filter for 3 and 6 iterations respectively, in accordance with the present framework. As shown by images 508 and 510, the iterative Hessian eigenvalue-based filter significantly reduces spurious responses in the filtered images, thereby allowing the fissure structure 502 to be more distinct against the background.

Referring back to FIG. 3, at 310, a discriminative model of multiple classes is constructed based on the low-level feature set. A discriminative model is a type of model that models the dependency of an unobserved variable on a variable observed from the feature set. For example, the discriminative model may learn the conditional distribution of each voxel over the class labeling. In one implementation, the discriminative model comprises a statistical or probabilistic model such as a conditional random field (CRF). The CRF is a sub-class of discriminative models that typically combines a generative random field model and a discriminative energy model. See, for example, Sanjiv Kumar, Martial Hebert, *Discriminative Random Fields*, International Journal of Computer Vision, 68(2): 179-201 (2006), which is hereby incorporated by reference.

In one implementation, the CRF captures the spatial interactions between class labels of neighboring voxels. The voxel-level segmentation module 202 automatically labels each voxel with the conditional probability of whether it belongs to a certain class given an image data observation. In the context of lung disease detection, for example, each voxel in the image data may be automatically labeled with the conditional probability of whether it corresponds to an anatomical structure, such as lung nodule, vessel, wall, fissure, parenchyma and so forth, given an image volume.

In one implementation, the conditional probability of a class label c given an image volume x is defined as follows:

$$\log P(c \mid x, \theta) = \sum_{i} \psi(c_i, x; \theta_\psi) + \sum_{(i,j) \in N_\epsilon} \varphi(c_i, c_j, x; \theta_\varphi) - \log Z(\theta, x) \quad (8)$$

where i, j are indices of voxels in a given volume, $N_\epsilon$ denotes the set of edges in a 6-connected grid structure, $\theta = \{\theta_\psi, \theta_\varphi\}$ are model parameters, $Z(\theta, x)$ is the normalization function independent of label c. It is understood that this equation may be modified to apply to 2-D or 4-D image data, or other data of any dimension, in which the graph neighborhood is defined.

The unary potential $\psi(c_i, x; \theta_\psi)$ usually indicates the individual label preference based on observed voxels and is defined as follows:

$$\psi(c_i, x; \theta_\psi) = \log P(c_i \mid x, i) \quad (9)$$

where $P(c_i \mid x, i)$ is the normalized distribution output from a voxel-level classifier given the low-level feature set of voxel i. This voxel-level classifier models the low-level features (e.g., texture, gray-level, shape, etc.) of the various classes. It can be generated by step 304 as previously discussed.

The pairwise (or edge) potential $\phi(c_i, c_j, x; \theta_\phi)$ encourages spatial coherence by penalizing label discontinuities between neighboring voxels with similar gray-levels. The pairwise potential may be in the form of a Potts Model, as follows:

$$\phi(c_i, c_j, x; \theta_\phi) = -\alpha e^{-\|x_i - x_j\|^2/\beta} \cdot \delta(c_i - c_j) \quad (10)$$

where $\alpha$ is the contrast parameter weighting unary and pairwise potentials, $\beta$ denotes the normalization parameter dependent on volume x and class label $c_i$, $c_j$, and $\delta(.)$ parameter is a Dirac delta function. The use of intensity contrast-based pairwise potential defined by Equation (10) is motivated by the observation that voxels within a single pulmonary structure of interest usually exhibit similar intensities in lung CT images. For example, nodule intensities can vary greatly across population according to the type of nodule (e.g., solid or ground glass), but they usually do not vary very much within one nodule. It is understood, however, that other types of pairwise potentials may also be used, depending on, for example, the type of application or imaging modality used.

The model parameters of the CRF model defined by, for example, Equation (8), may be learned from the low level feature set by a variety of methods. In one implementation, the voxel-level segmentation module 202 learns the model parameters by using a stepwise training method that estimates the unary and pairwise potentials separately. More particularly, the stepwise method includes first training the terms in the CRF separately, and then recombining the terms with powers (e.g., via weighted functions) that alleviate problems due to overcounting. An exemplary stepwise training method is described in J. Shotton, J. Winn, C. Rother, and A. Criminisi, *TextonBoost for Image Understanding: Multi-Class Object Recognition and Segmentation by Jointly Modeling Texture, Layout, and Context*, IJCV, 81:2-23, 2009, which is herein incorporated by reference. Alternatively, the model parameters may be estimated by a maximum a-posteriori (MAP) method that maximizes the conditional likelihood of labels given the training data. The maximization may be achieved using a gradient ascent algorithm or any other suitable method. It is understood that other methods may also be used to learn the model parameters.

The unary potential parameters of the CRF model defined by Equation (9) may be learned by a supervised classifier, such as a generative classifier, a discriminative classifier, or a combination thereof. A generative classifier learns the model parameters by first estimating the class conditional densities, and then classifying each new data point to the class with the highest posterior probability. A discriminative classifier, on the other hand, directly models the conditional distribution, without assuming anything about the input distribution. Examples of a generative classifier include, but are not limited to, resilient subclass discriminant analysis (RSDA), linear discriminant analysis (LDA), and naive Bayes classifier. A discriminative classifier may be, for example, a relevance vector machine (RVM) classifier, a linear logistic regression classifier, a generalized additive model (GAM) classifier, and so forth. It is to be noted that any other types of classifiers may also be used.

In one implementation, the unary potentials are learned by resilient subclass discriminant analysis (RSDA) as a generative classifier. RSDA approximates the distribution of each class as a mixture of Gaussians, and estimates the probability model parameters using expectation-maximization integrated with linear discriminant analysis. See, for example, D. Wu and K. L. Boyer; *Resilient Mixture Discriminant Analysis*, Proc. ICCV, 2009, which is herein incorporated by reference. This method is naturally phrased in a multi-class framework by computing the conditional probability response map (PRM) as follows:

$$P(c|x_i) = \frac{\sum_{j=1}^{Nc} \rho_{c_j} g\left(x_i; \mu_{c_j}, \sum_{c_j}\right)}{\sum_{c=1}^{C}\sum_{j=1}^{Nc} \rho_{c_j} g\left(x_i; \mu_{c_j}, \sum_{c_j}\right)} \quad (11)$$

where P is a posteriori probability of each class c given voxel intensity $x_i$, C is the number of classes, $N_c$ is the number of subclasses in class c, and $\rho_{c_j}$, $\mu_{c_j}$ and $\Sigma_{c_j}$ are the prior, mean vector and covariance matrix of subclass j in class c obtained by the RSDA, respectively.

Alternatively, or in combination thereof, the unary potentials may be learned by a relevance vector machine (RVM). A RVM is a discriminative classifier that uses Bayesian inference to obtain sparse solutions for classification. See, for example, V. Raykar, B. Krishnapuram, J. Bi, M. Dundar, and R. B. Rao, *Bayesian multiple instance learning: automatic feature selection and inductive transfer*, Proc. ICML, 808-815, 2008, which is herein incorporated by reference. It was originally derived for two-class problems and can be extended to multi-class settings by training and combining a series of n one-vs-rest binary classifiers. RVM has a functional form that is identical to a support vector machine (SVM) but offers additional benefits. Such benefits include automatic estimation of regularization coefficients and probabilistic predictions so that no cross-validation based post optimization or heuristic calibration prior to combining the multiple binary classifiers is required.

The distribution of each class may be approximated by the RVM as follows:

$$P(c|x_i) = \frac{\sigma(y(x_i, w_c))}{\sum_{c=1}^{C} \sigma(y(x_i, w_c))} \quad (12)$$

where $\sigma(x)=1/(1+e^{-x})$ is the logistic sigmoid function and $y(x_i, w_c)=w_c^T x_i$ including the offset or $y(x_i,w_c)=w_c^T \phi(x_i)$ if a nonlinear kernel is used. $w_c$ is the weight vector for class c learned via RVM.

The pair-wise potential in the CRF model, as defined in, for example, Equation (10), is volume dependent. It may be learned by setting the normalization parameter $\beta$ to $2\|\bar{x}_i - \bar{x}_j\|^2$ where $\bar{x}_i$ denotes the average voxel intensity of class i in the volume given a posteriori probabilities derived from the unary classifier described previously. The contrast parameter $\alpha$ may be manually tuned to minimize error in the validation data.

At 312, the voxel-level segmentation module 202 determines the optimal labeling c* based on the discriminative model and its learned parameters. The optimal labeling c* may be determined by maximizing Equation (8) using a graph-cut method. In one implementation, the graph-cut method includes constructing a directed graph associated with the image data and performing a max-flow/min-cut algorithm on the graph so as to achieve a globally optimal segmentation while satisfying hard constraints. See, for example, Y. Boykov and G. Funka-Lea, *Graph Cuts and Efficient N-D Image Segmentation*, IJCV, 70(2):109-131, 2006 and Y. Boykov, O. Veksler and R. Zabih, *Fast Approximate Energy Minimization via Graph Cuts*, IEEE Trans. Pattern Anal. Mach. Intell., 23(11):1222-1239, November 2001, which are herein incorporated by reference.

Subvolume-Level Classification

The hard segmentation results obtained by the voxel-level segmentation module 202 can be used directly to determine whether the detected structures (e.g., pulmonary nodules) are solitary or attached using simple n-connected component algorithm. However, such determination may be highly sensitive to possible voxel-level segmentation errors, such as noise in the filtered images. In one implementation, the subvolume-level module 204 trains a second classifier may be trained using higher level subvolume features extracted from the conditional probability response maps (PRMs) output by the voxel-level classifier. These features exploit the spatial co-occurrence statistics of the structures to make the system more robust to the results of voxel-level segmentation, thereby reducing false positives and improving the accuracy of detection.

Figure 6:
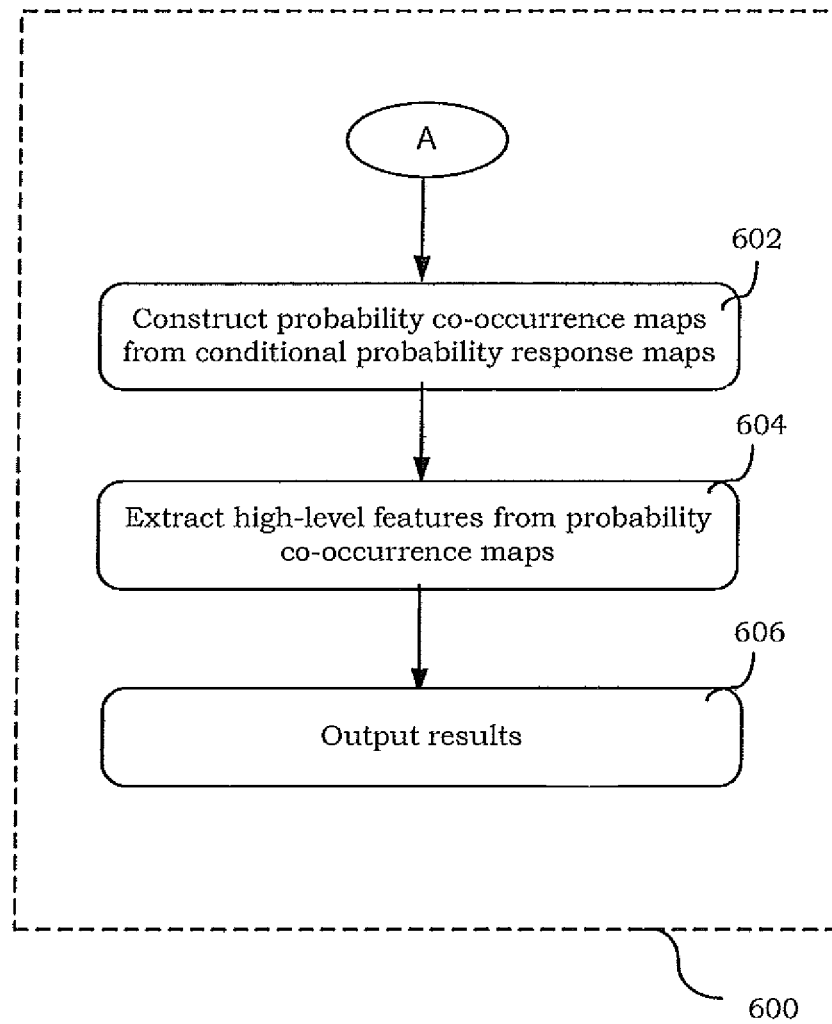
FIG. 6 illustrates an exemplary subvolume-level classification method.

FIG. 6 illustrates an exemplary classification method 600 that may be implemented by the subvolume-level classification module 206. At 602, the subvolume-level classification module 206 constructs one or more probability co-occurrence maps (PCMs) from the conditional probability response maps (PRMs) generated by the voxel-level segmentation module 202. In a PCM, higher responses occur where the structure (e.g., nodule) touches another structure (e.g., vessel, fissure, airway, wall) with certain translation. In other words, the PCM is modeled based on the observation that if 2 objects are connected or very close to each other, both of their probability maps will have higher responses in the same area where the two objects overlap after one of the maps is moved by a small offset.

An exemplary PCM $\kappa$ may be defined as follows:

$$\kappa_{n,m}(x, y, z) = \sum_{(i,j,k) \in W} P_n(i, j, k) P_m(i+x, j+y, k+z) \quad (13)$$

where $P_n$ and $P_m$ are the probability maps of the candidate structure of interest (e.g., pulmonary nodule) and another class of interest obtained from the voxel level classifier, as defined in, for example, Equations (11) or (12), which were previously discussed. W is a local window around the detected structure, and (x; y; z) is the offset. The PCM provides a quantitative measure of the possibility that a pair of objects co-occur in the volume with different spatial offsets. Equation (13) is essentially the correlation of two class probability maps where the structure probability map $P_n(x,y,z)$ serves as a filter with the kernel roughly in the shape and size of the detected structure, and enhances the output to make the higher level classifier more robust to voxel-level segmentation noise.

At 604, the subvolume-level classification module 206 extracts higher level subvolume features from the probability co-occurrence maps. As discussed previously, if the nodule is close to another structure, the probability co-occurrence map is expected to have higher responses for some small offset. Accordingly, the set of subvolume features may be defined by summing up the PCMs $\kappa(x,y,z)$ on spherical surfaces with different radii. This is equivalent to measuring the correlation at different discrete distances from the center of the correlation image. The surface radius (e.g., $r=\sqrt{x^2+y^2+z^2}$) may be varied over a predetermined range. For example, a total of 10 basic and rotation-invariant features may be generated for each of the three nodule connectivity cases by varying the surface radii over a range of 1 to 10 by regular intervals. It is understood that any other number of features may also be generated by adjusting the range and interval size.

In the context of lung images, if the nodule is attached to a fissure or vessel, the probability co-occurrence map will have higher responses in a plate-like or tubular area crossing the origin. This is because $\kappa$ is essentially the correlation of two probability maps, and the nodule is usually much smaller than the fissure and the vessel. Enhanced features may be extracted by exploiting these specific structure shapes in a similar manner as the Hessian filters used in the low-level features extraction step 304. This advantageously makes up for the voxel level segmentation errors to some extent and is particularly useful for fissure connectivity classification.

For example, similar to Equation (3), the enhanced feature for fissure structures may be defined as follows:

$$F=(1-\exp(-m_\kappa^2/2\gamma^2))\exp(-\lambda_3^2/2\beta^2 2\lambda_2^2)\exp(-d^2/2\alpha^2 r_n^2) \quad (14)$$

where $\gamma$, $\beta$ and $\alpha$ are the threshold parameters. $m_\kappa$ is the average response of probability co-occurrence map in the local window W, $r_n$ is the nodule size approximated as:

$$r_n = (3/4\pi \Sigma_{(x,y,z) \in W} P_n(x,y,z))^{1/3} \quad (15)$$

$\lambda_1$, $\lambda_2$ and $\lambda_3$ are three eigenvalues of the weighted covariance matrix of all offset vectors $(x,y,z) \in W$ with normalized weights $\kappa_{n,m}(x,y,z)/(m_\kappa|W|)$, in descending order of absolute value $|\lambda_1| \geq |\lambda_2| \geq |\lambda_3|$. d is the distance between the origin to the planar surface, which is defined as $(\overline{x},\overline{y},\overline{z})^T v_3$ where $(\overline{x},\overline{y},\overline{z})$ denotes the weighted mean of the offset vectors, and $v_3$ is the eigenvector corresponding to the smallest eigenvalue $\lambda_3$. If there exists a plate-like structure crossing the origin in the probability co-occurrence map $\kappa$, $|\lambda_3|$ will be much smaller than $|\lambda_2|$ with d smaller than the nodule size $r_n$.

Figures 12A, 12B:
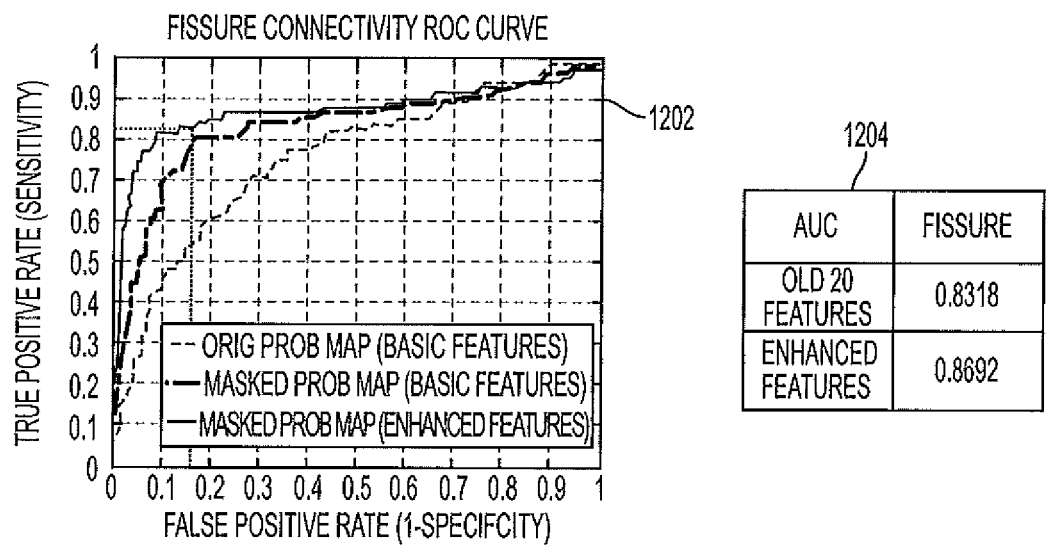
FIG. 12(b) shows a table that summarizes the connectivity classification performance of three connectivity cases.

Because a single structure can be attached to multiple structures as shown in FIG. 12, the connectivity classification may be characterized as a multi-label problem. Therefore, multiple RVM classifiers may be trained and tested independently for each connectivity case. For example, three binary RVM classifiers may be trained and tested independently for each of the three connectivity cases on 10, 10 and 11 features respectively.

Results

Testing of exemplary systems and methods in accordance with the present disclosure included acquiring 784 lung CT subvolumes from 239 subjects. Each subvolume was 83×83× 83 voxels in size, and had a nodule in the center with a variety of appearances and contextual anatomy connectivity as shown in, for example, FIG. 10. The labeled voxels of pulmonary structures were obtained from 34 randomly selected subvolumes of different patients by two radiologists based on visual assessment and consensus review. The radiologists were requested to evenly sample different parts of each structure, including major and minor lobar fissures, veins and arteries, from hilum to peripheral level, parenchyma in the open area and close to the structures such as vessel and lung wall, solid and ground glass opacity nodules. More than 200,000 sample voxels were marked with approximately 6%, 20%, 25%, 11% and 38% samples labeled as nodule, vessel, lung wall, fissure and parenchyma, respectively. A radiologist then annotated the nodule connectivity of the 784 subvolumes, of which 254 cases were vessel attached, 150 nodules were pleural-based (or lung wall connected), and 81 cases were fissure-attached.

The accuracy of the voxel-level segmentation of a lung anatomy by a unary classifier was tested on the 34 subvolumes. The 34 "voxel painted" subvolumes were randomly split into a training data pool and a testing data pool. The performance of the RVM and RSDA classifiers were tested using the texture, intensity and shape features previously described with reference to FIG. 3.

FIG. 7 shows exemplary pairwise confusion matrices 702(a)-(b) for five pulmonary structure classes (nodule, vessel, wall, fissure and parenchyma) generated by classifiers that are not based on the CRF model. Confusion matrices 702(a)-(b) illustrate the performance of the RSDA classifier and the RVM classifier respectively. In particular, each confusion matrix illustrates how the classifier is confusing or mislabeling the classes. Each row of a confusion matrix represents the instances in a predicted class, while each column represents the instances in an actual class.

As shown, the RSDA and RVM classifiers achieved very similar classification performance, achieving about 90.1% and 89.3% in overall recognition rate respectively. Both confusion matrices 702(*a*)-(*b*) show similar pairs of classes where misclassification is more likely to occur. For example, relatively high prediction values 704(*a*)-(*b*) show that fissures are more easily confused with parenchyma, because the fissures can be faint and incomplete. Similarly, prediction values 706(*a*)-(*b*) show that vessels and nodules are likely to be confused, because vessel bifurcation or branch points may appear locally more blob-like as nodules and less tubular.

Figure 8:
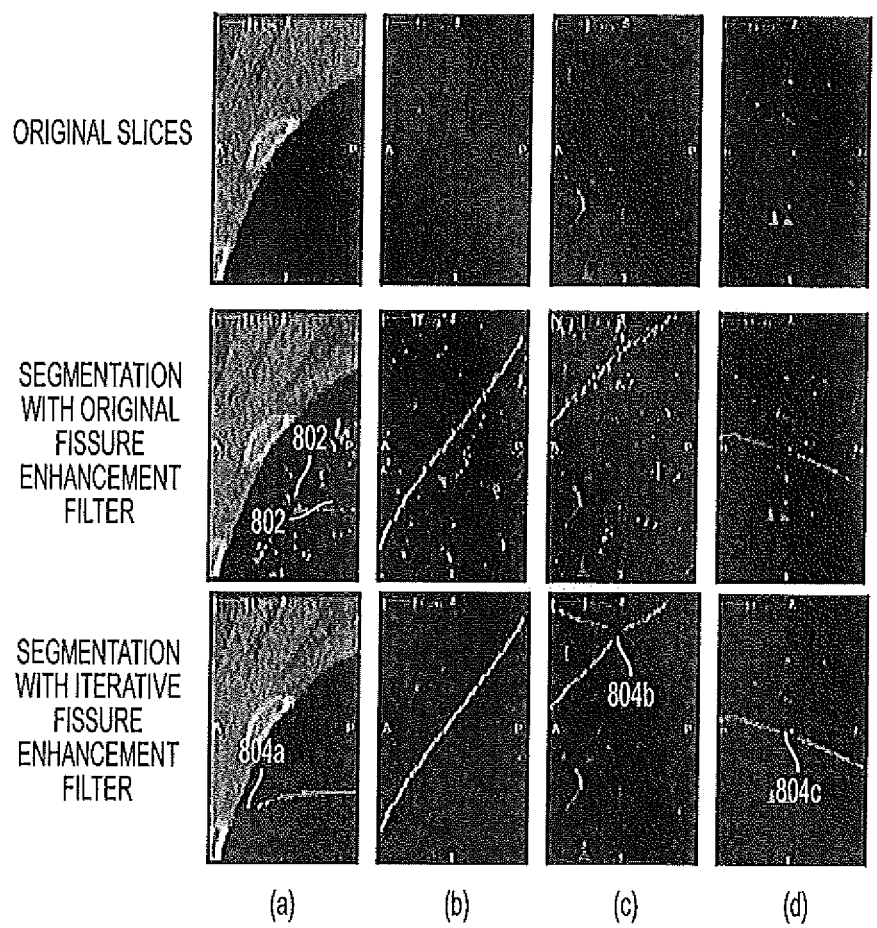
FIG. 8 shows exemplary segmented images.

Fissure segmentation improvement by the previously described iterative fissure enhancement filters was also validated. FIG. 8 shows exemplary segmented images. In particular, the top row shows the original slices before segmentation, the middle row shows the segmentation results generated by applying the original fissure enhancement filter and the bottom row shows the results output by applying the iterative fissure enhancement filter in accordance with the present framework.

As shown by the middle row, the classification results using the original fissure enhancement filter features contain pepper-and-salt labeling noise 802, which may appear as short strokes in 3D. With the iterative fissure enhancement filter features, as illustrated by the bottom row, the misclassification errors are so significantly reduced that they can be easily eliminated by a simple connected component removal algorithm. In addition, the iterative filtering is computationally efficient and takes only about 2 seconds to complete 6 iterations on a 83×83×83-voxel subvolume.

Nevertheless, the segmentation results may break up in certain situations. For example, where the fissure connects to the lung wall (804*a*), where two or more fissures join (804*b*), or where the fissure is attached to other structures like nodule or vessel (804*c*). This is reasonable because the assumption that a locally plate-like structure exists does not hold in these situations. If more accurate fissure segmentation is required, a post-processing algorithm may be applied to fill up the discontinuities. One exemplary post-processing algorithm is the fissure extension algorithm described in J. Pu, J. K. Leader, and et al., *A Computational Geometry Approach to Automated Pulmonary Fissure Segmentation in CT Examinations*, IEEE Trans. Med. Imaging, 28(5):710-719, May 2009, which is herein incorporated by reference.

Figure 9:
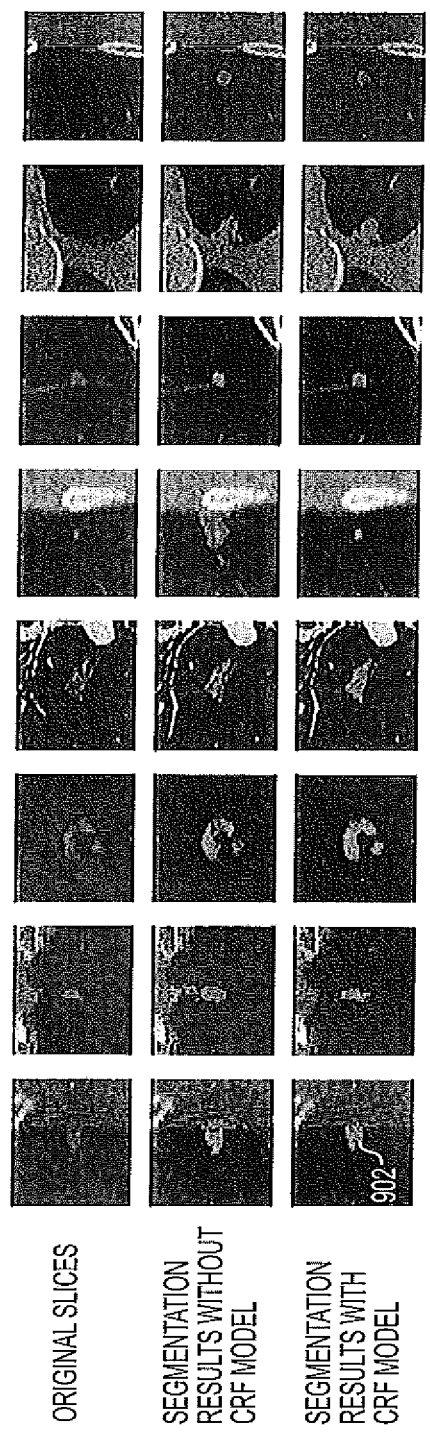
FIG. 9 shows the nodule segmentation results obtained by applying an exemplary CRF model.

FIG. 9 shows the nodule segmentation results obtained by applying the CRF model. The subvolumes were segmented by incorporating the pairwise constraints from edge cues and optimizing the conditional random field model via graph-cut. The overall classification rate increased from 90.1% to 91.2%. While the improvement was numerically small, the contour of the structure, especially the nodule 902, was more accurately delineated and therefore provided a considerable improvement in perceived accuracy. However, a more precise segmentation of the nodule boundaries may be desired for the subvolume level classification module to classify nodule connectivity.

The subvolume level classification module was tested by first splitting the 784 subvolumes into training and testing data via a ten-fold cross validation, which was repeated for 20 times. The results were then averaged over 20 runs. The subvolumes from the same patient were always kept within the same fold.

FIG. 10 shows a table 1001 illustrating the classification performance of nodule connectivity using hard segmentation results and an n-connected (n=6, 18, 26) component algorithm. No training was required for this method. The experimental results show that the sensitivity (SN) and specificity (SP) are quite unbalanced, especially for the case of fissure connectivity (SN=18.5% and SP=97.6%). This can be explained by the observation that the fissure segmentation misses where it is attached to lung nodules. See, for example, 804*c* in FIG. 8(*d*). The trade-off between specificity and sensitivity may be achieved by changing n in the connected component algorithm, but such adjustment is quite limited.

Figure 11A:
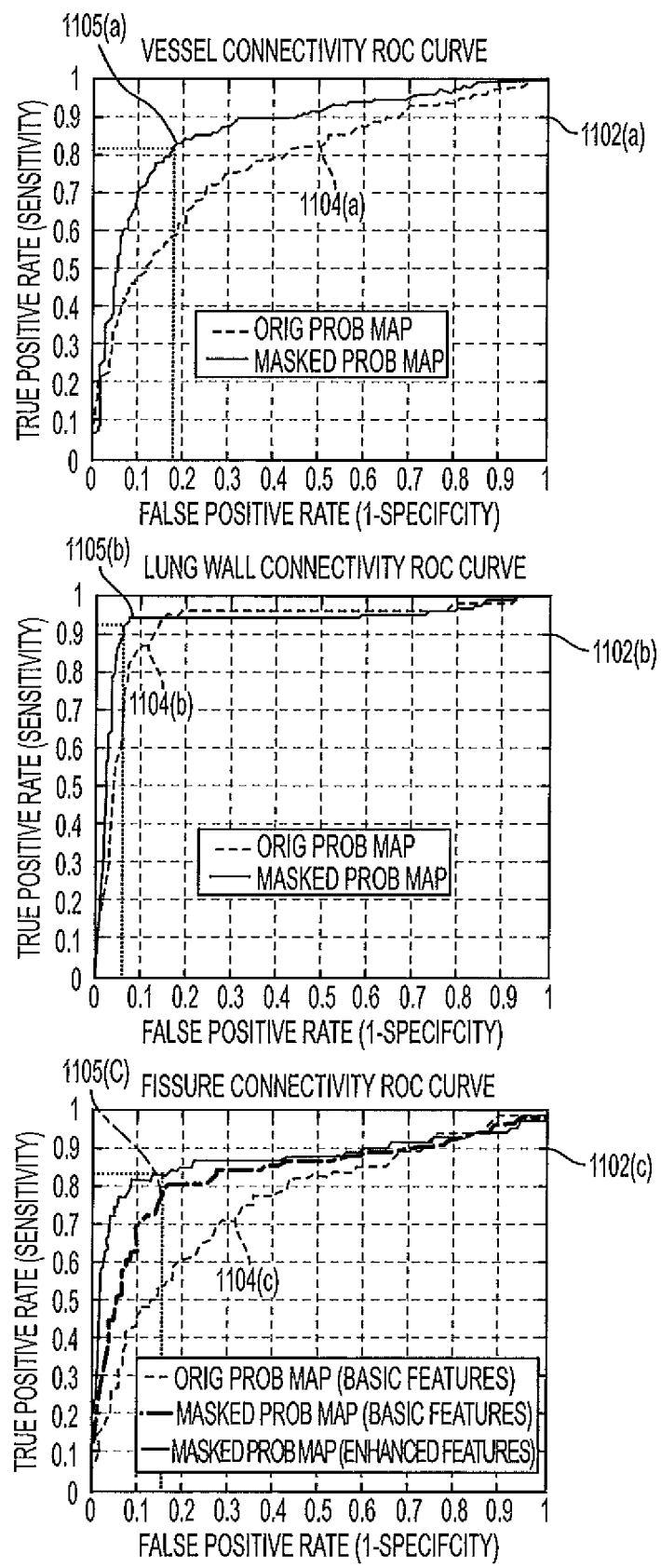
FIG. 11($a$) shows exemplary ROC curves of lung nodule connectivity classification.
Figure 11B:

FIG. 11(*a*) shows the receiver operating characteristic (ROC) curves 1102(*a*)-(*c*) of lung nodule connectivity classification based on different probability maps. The ROC curves 1104(*a*)-(*c*) depicted by broken lines are based on the original probability maps directly derived from the unary classifier, and the ROC curves 1105(*a*)-(*c*) depicted by solid lines are based on the probability maps masked by the hard segmentation results from CRF model. FIG. 11(*b*) shows a table 1106 illustrating the corresponding areas under the ROC curves (AUC) in FIG. 11(*a*). Significant improvement in nodule connectivity classification is evident from the ROC curves 1102(*a*)-(*c*), by observing the increase in AUC in all three connectivity cases. The AUC increases are 0.0883, 0.0091 and 0.0763 for vessel, wall and fissure connectivity classification respectively, as shown by FIG. 11(*b*).

To test fissure connectivity classification, the enhanced features computed by implementing Equation 14 were used. FIG. 12(*a*) shows a graph 1202 of the fissure connectivity ROC curves, as well as a table 1204 with AUC values before and after the fissure enhancement. The ROC curves were obtained by applying the original probability map and the masked probability maps based on basic and enhanced fissure features. As illustrated, an improvement in connectivity classification can be achieved by using the enhanced fissure features, with the AUC increasing from 0.8318 to 0.8692.

FIG. 12(*b*) shows a table 1206 that summarizes the connectivity classification performance of the vessel, wall and fissure connectivity cases after applying the enhancements in accordance with the present disclosure. As shown, sensitivity and specificity of the classification are significantly improved in all three cases, especially fissure connectivity classification.

Figure 13:
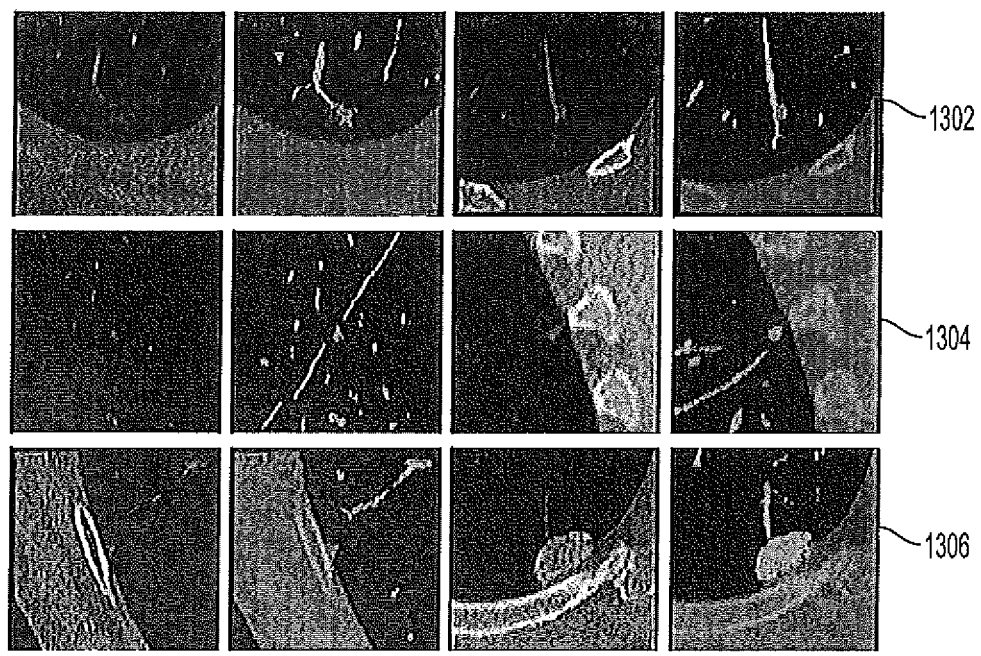
FIG. 13 shows exemplary nodule segmentation results.

FIG. 13 shows exemplary nodule segmentation results. The top row 1302 shows the original slices before segmentation, while the middle row 1304 and bottom row 1306 show the segmentation results without and with the CRF model respectively. Attached nodules were correctly identified by the system with corresponding segmentation results. This clearly demonstrates that the subvolume level classifier can recognize the connectivity regardless of the missed fissure segments surrounding the nodule (as discussed previously), where the simple n-connected component algorithm will probably fail.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A computer-implemented method for classifying a structure in digital image data, comprising:
 (a) extracting a first set of features from the digital image data;
 (b) learning a discriminative model based on the first set of features, wherein the discriminative model is associated with at least one conditional probability of a class label given an image data observation;

(c) determining, based on the at least one conditional probability, at least one likelihood measure of the structure co-occurring with another structure in a same sub-volume of the digital image data; and (d) extracting a second set of features from the one or more likelihood measures.

2. The method of claim 1 wherein the extracting the first set of features from the image data comprises extracting at least one texture feature, gray-level feature, shape feature, or a combination thereof.

3. The method of claim 1 wherein the extracting the first set of features from the image data comprises applying a Hessian enhancement filter to the image data.

4. The method of claim 3 wherein the applying the Hessian enhancement filter comprises iteratively applying the Hessian enhancement filter to the image data until a stop condition is met.

5. The method of claim 1 wherein the learning the discriminative model comprises constructing a conditional random field model.

6. The method of claim 1 wherein the learning the discriminative model comprises learning one or more parameters of the discriminative model using a supervised classifier.

7. The method of claim 6 wherein the supervised classifier comprises a generative classifier.

8. The method of claim 7 wherein the generative classifier comprises a resilient subclass discriminant analysis classifier.

9. The method of claim 6 wherein the supervised classifier comprises a discriminative classifier.

10. The method of claim 9 wherein the discriminative classifier comprises a relevance vector machine classifier.

11. The method of claim 1 further comprising performing a graph-cut method to determine optimal labeling based on the discriminative model.

12. The method of claim 1 wherein the determining the at least one likelihood measure comprises determining at least one probability co-occurrence map.

13. The method of claim 12 wherein the extracting the second set of features comprises summing multiple probability co-occurrence maps.

14. A non-transitory computer readable medium embodying a program of instructions executable by a machine to perform steps for classifying a structure in digital image data, the steps comprising:

(a) extracting a first set of features from the digital image data;

(b) learning a discriminative model based on the first set of features, wherein the discriminative model is associated with at least one conditional probability of a class label given an image data observation;

(c) determining, based on the at least one conditional probability, at least one likelihood measure of the structure co-occurring with another structure in a same sub-volume of the digital image data; and (d) extracting a second set of features from the one or more likelihood measures.

15. A system for classifying a structure in digital image data, comprising:

a memory device for storing computer readable program code; and a processor in communication with the memory device, the processor being operative with the computer readable program code to perform steps for classifying a structure in digital image data, the steps comprising:

(a) extracting a first set of features from the digital image data;

(b) learning a discriminative model based on the first set of features, wherein the discriminative model is associated with at least one conditional probability of a class label given an image data observation;

(c) determining, based on the at least one conditional probability, at least one likelihood measure of the structure co-occurring with another structure in the same sub-volume of the digital image data; and (d) extracting a second set of features from the one or more likelihood measures.

16. The system of claim 15 wherein the digital image data comprises medical images of at least a portion of a lung.

17. The system of claim 16 wherein the at least one likelihood measure comprises a likelihood measure of a lung nodule co-occurring with another pulmonary structure in the same sub-volume of the digital image data.

18. The system of claim 17 wherein the another pulmonary structure comprises a lung fissure, pleural or vessel.

* * * * *